(12) United States Patent
Aaron et al.

(10) Patent No.: US 11,950,586 B1
(45) Date of Patent: Apr. 9, 2024

(54) SURFACES COATED WITH HIGH VISCOSITY INDEX PETROLEUM BASED GEL AND METHODS FOR USE AS A BARRIER TO CRAWLING INSECTS

(71) Applicants: Erica Kate Aaron, Escondido, CA (US); Ernest Lacey Aaron, III, Escondido, CA (US)

(72) Inventors: Erica Kate Aaron, Escondido, CA (US); Ernest Lacey Aaron, III, Escondido, CA (US)

(73) Assignee: Gus Goods LLC, Chapin, SC (US)

( * ) Notice: Subject to any disclaimer, the term of this patent is extended or adjusted under 35 U.S.C. 154(b) by 677 days.

(21) Appl. No.: 16/937,220

(22) Filed: Jul. 23, 2020

Related U.S. Application Data

(62) Division of application No. 16/009,004, filed on Jun. 14, 2018, now Pat. No. 10,779,526.

(51) Int. Cl.
*A01M 1/10* (2006.01)
*A01M 23/00* (2006.01)

(52) U.S. Cl.
CPC .......... *A01M 1/103* (2013.01); *A01M 23/005* (2013.01); *A01M 2200/011* (2013.01)

(58) Field of Classification Search
CPC ...... A01M 1/103; A01M 1/14; A01M 23/005; A01M 2200/011
See application file for complete search history.

(56) References Cited

U.S. PATENT DOCUMENTS

| | | | | |
|---|---|---|---|---|
| 4,784,086 A * | 11/1988 | Hand | ...... | A01M 1/24 119/61.53 |
| 5,148,626 A * | 9/1992 | Haake, Sr. | ...... | A01M 1/2011 43/109 |
| 5,303,523 A * | 4/1994 | Hand | ...... | A01M 1/18 52/62 |
| 6,378,242 B1 * | 4/2002 | Roberts | ...... | A01M 29/34 43/109 |
| 7,793,461 B2 * | 9/2010 | Klein | ...... | A01M 1/18 43/109 |
| 2015/0305318 A1 * | 10/2015 | Moriarty | ...... | F15B 15/08 43/123 |

FOREIGN PATENT DOCUMENTS

CN 114208723 A * 3/2022

* cited by examiner

*Primary Examiner* — Christopher R Harmon

(57) ABSTRACT

Means and methods for preventing crawling insects from infesting a site where food, water, or garbage is located. In particular, this relates to creating a non-poisonous barrier in the path of the insects by coating a surface with a layer of high viscosity index petroleum based gel (HVIP-gel). One embodiment is an insect deterrent cup that is comprised of an inverted (upside down) cup whose inner surface is coated with a layer of PetrolGel. The insect deterrent cup is positioned between the food site and the crawling insects, blocking their path. This prevents crawling insects from accessing the food, water, or garbage.

4 Claims, 4 Drawing Sheets

SURFACES COATED WITH HIGH VISCOSITY INDEX PETROLEUM BASED GEL AND METHODS FOR USE AS A BARRIER TO CRAWLING INSECTS

CROSS-REFERENCE TO RELATED APPLICATIONS

This is a division of application Ser. No. 16/009,004, filed 2018, June 14, the entire content of which is hereby incorporated herein by reference.

FEDERALLY SPONSORED RESEARCH

None

BACKGROUND

This invention generally relates to means and methods for preventing crawling insects from infesting a site where food, water, or garbage is located. Many households and businesses struggle with preventing ants and other crawling insects from infesting food, water, or garbage that is not kept in an air-tight container. This can feel like a constant battle, especially for people who live in warmer climates or during summer months, when insects are more persistently searching for food and water. Some items that are commonly left out of sealed containers are routinely infested by ants, such as sugar, honey, baked goods, breakfast cereal, food scraps in the trash or compost can, leftovers at a picnic table, hummingbird feeder nectar, a pet water bowl, and wet or dry pet food, to name a few non-limiting examples.

To deter insect invasions, some homeowners and business owners opt for professional pest spraying services. This can be expensive, it must be repeated, the insecticide is applied to large areas around the building, and many people are concerned about having poisonous chemicals in close proximity to their food, families and pets. Other people forego pest-killing chemicals altogether, and keep to a strict regimen of storing foods in sealed containers. However, this doesn't solve the problem in every case, such as ant-infested hummingbird feeders, or, for example, a pet dog or cat that doesn't finish all of their food in one sitting. This leftover food attracts insects into our living spaces, creates waste of food that has to be discarded, and potentially exposes us to chemicals that the insects were exposed to.

Some pet owners resort to the moat method of deterring crawling insects from pet food. This involves filling a dish with a shallow level of a liquid, such as water, and placing the food bowl in the center of this liquid. The liquid moat acts as a temporary obstacle to crawling insects. However, there are many problems with the moat method of deterring crawling insects from food. The first problem is that moats can be spilled, creating a mess. Even if a moat is not spilled, the moat liquid can evaporate, and require refilling. If not cleaned regularly, moat liquid can grow stagnant and foul, especially when pieces of pet food are dropped into it. Further, the remains of dead insects and other debris can accumulate in an unmaintained moat, creating a crossable bridge for live insects to access the food. Manufacturers have long sought a clean, low-maintenance, and effective way to prevent crawling insects from infesting food, and the moat method is not it. Insofar as I am aware, there are no truly effective insect-blocking products that are food-grade, low maintenance, long lasting, weather resistant, and easy to employ at a variety of sites where food or water is located.

SUMMARY

An object of this invention is to prevent crawling insects from infesting a site where food or water is located by creating a non-poisonous barrier, such as a layer of high viscosity index petroleum based gel (HVIP-gel). In one embodiment, an inverted (upside down) cup whose inside surface is coated with HVIP-gel (referred to here as an insect deterrent cup) can be positioned between the food site and possible paths of access to the food site, creating a barrier to crawling insects and preventing infestation of the food. The insect deterrent cup can be mounted underneath a bowl that is supported by a shaft with a base that rests on the ground, the floor or a table. A plurality of insect deterrent cups can be mounted to the bottom of one large platter, tray, or container to achieve stability. Insect deterrent cups can be constructed around the legs of a table, or around the legs of a stand that supports a beehive. An insect deterrent cup can alternatively be connected inline with a string, chain, or wire that suspends a hanging hummingbird feeder.

One example of a HVIP-gel is the commercially available food grade lubricant PetrolGel. PetrolGel is sold by the McGlaughlin Oil Company as a USDA H1 authorized lubricant for use with equipment that comes into incidental contact with food. PetrolGel consists of a base oil with added thickeners. The ingredients in PetrolGel are 75-90% white mineral oil (petroleum) and less than 10% aluminum, benzoate hydrogenated tallow fatty acid iso-Pr alc. complexes. PetrolGel is a commonly used sanitary lubricant among soft serve ice cream manufacturers as well as other food processors and manufacturers. Its safety around people and food makes it an appealing alternative to insecticides. The base oil in PetrolGel has a high viscosity index of 1 0 1, which means that its viscosity is not strongly affected by changes in temperature. The melting point of PetrolGel is 195° F., so it will not melt in full sun in very hot climates (unlike Vaseline®, which has a melting point of 99° F.). PetrolGel is also impervious to water, so it won't wash off in the rain. All of these properties make PetrolGel a safe, effective, and long-lasting insect deterrent.

This method truly blocks crawling insects from infesting a food site. Other gels and pastes were tested for their effectiveness against crawling insects, and each one (aside from PetrolGel) eventually failed. For instance, lanolin grease dried up over a period of weeks. Vaseline® melted and ran off in the warm sun. Dow Corning® High Vacuum Grease worked for months, but ants were able to walk across it if it was applied to the top (rather than the underside) of a horizontal surface. PetrolGel completely blocked crawling insects, except in one special case. In the experiment that led to this failure, a nugget of dog food was glued to the top of a metal plate using peanut butter as the glue, and a thin layer of PetrolGel was smeared as a barrier encircling the dog food nugget and peanut butter. The plate was placed horizontally on the ground near an active ant colony. Initially, no ants were able to cross the PetrolGel. However, after a period of about 12 hours, ants had built a bridge out of little pieces of sticks and leaves over the PetrolGel. In subsequent experiments, ants could not build such a bridge when the PetrolGel-coated surface was upside down. It was concluded that application of the PetrolGel to the underside of a surface is a component partly responsible for the longevity of its impenetrability to crawling insects. It was also noted that PetrolGel itself created an effective barrier to crawling insects, without the need for added insect deterrent substances (such as permethrin or capsaicin to name some examples).

The instant embodiment is a method of preventing crawling insects from infesting a site where food or water is located, comprising coating a surface with a layer of high viscosity index petroleum based gel (HVIP-gel), and positioning the surface across any possible path that a crawling insect could take to access the food or water site, whereby crawling insects will be unable to traverse the surface coated in the HVIP-gel and will be prevented from reaching the food or water site. The HVIP-gel may be PetrolGel.

A further embodiment is an insect deterrent cup comprising a cup that is oriented upside-down, a layer of HVIP-gel that is coated on the inside surface of the cup, and a means for positioning the cup so that it intersects any possible path that a crawling insect could take to reach a site where food or water is located, whereby crawling insects will be unable to traverse the HVIP-gel and will be prevented from reaching the food or water site. The HVIP-gel may be PetrolGel.

DRAWINGS—BRIEF DESCRIPTION

DRAWINGS—DETAILED DESCRIPTION

Figure 1:
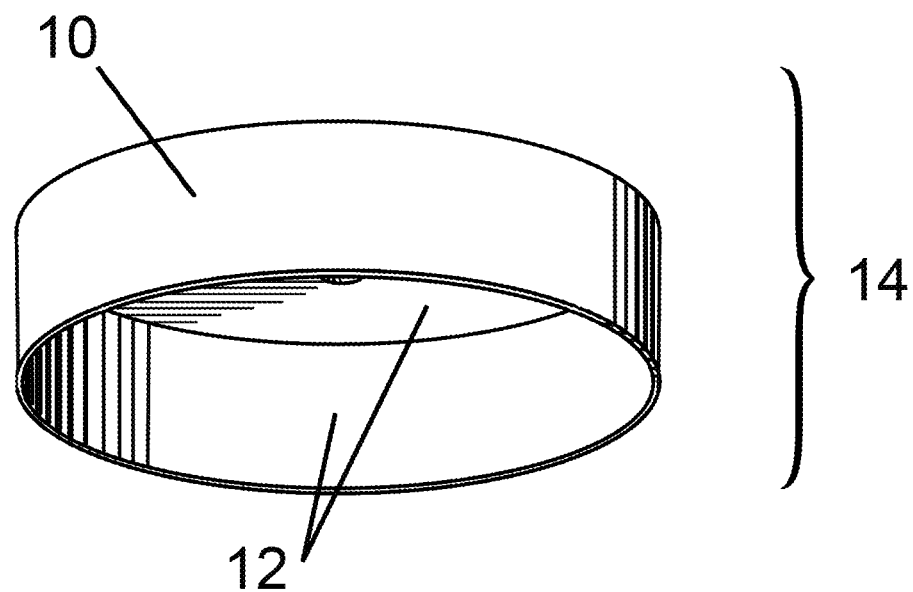
FIG. 1 is a perspective view of an insect deterrent cup.

FIG. 1 is a perspective view of an insect deterrent cup 14, constructed in accordance with one embodiment. The inside surface 12 of the inverted cup is completely coated with a layer of PetrolGel.

Figure 2:
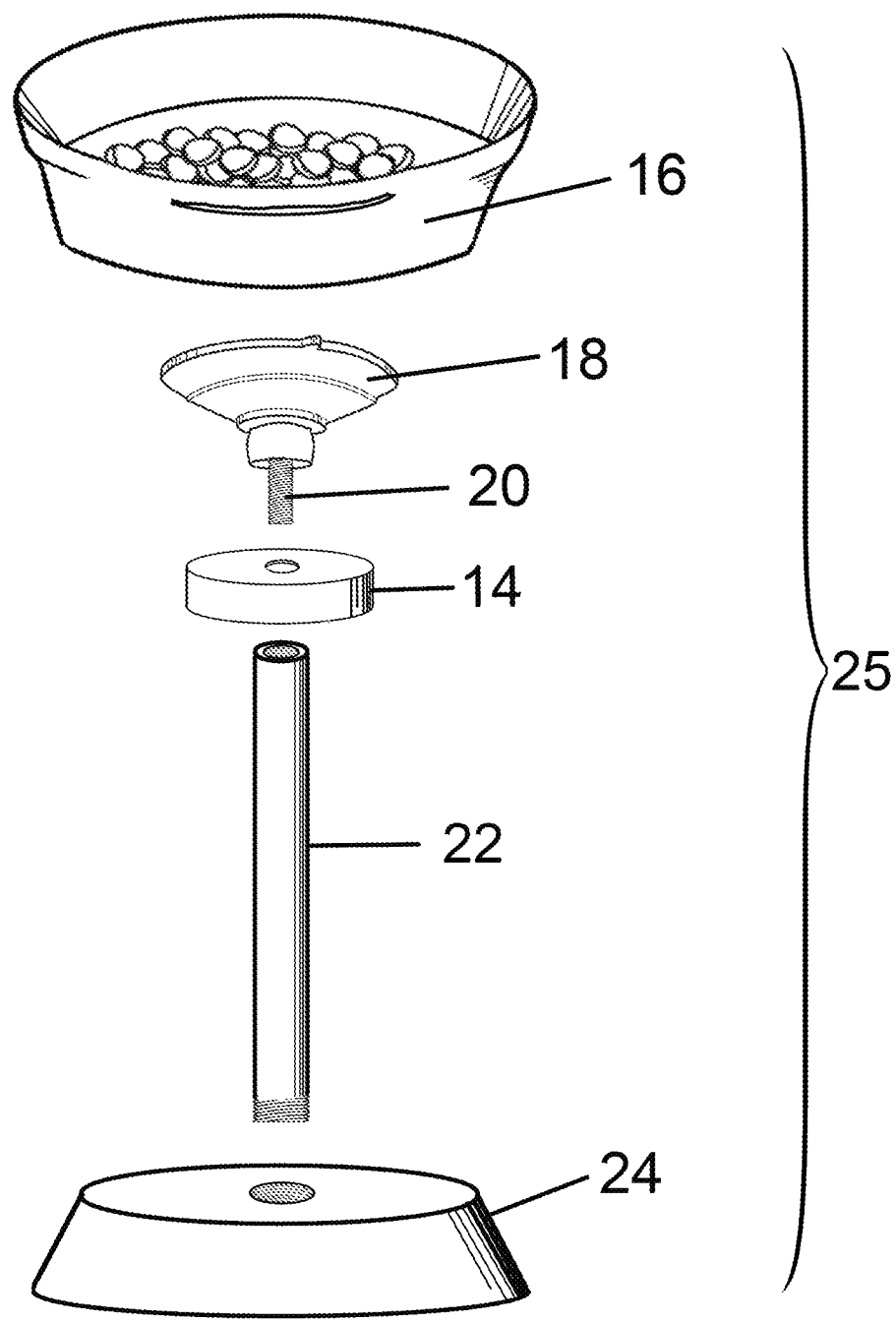
FIG. 2 is an exploded view of a pet feeder with an insect deterrent cup and weighted base constructed in accordance with one embodiment.

FIG. 2 is an exploded view of an elevated pet feeder 25 with an insect deterrent cup 14 and weighted base 24 constructed in accordance with one embodiment. A pet food bowl 16 is attached to the top end of a support shaft 22 with a suction cup 18. Other means of attachment could be used here, such as adhesive tape, glue, nuts and bolts, magnets, or Velcro®. The suction cup 18 has several advantages over other means of attachment. For example, it can be easily and temporarily attached to any clean, smooth, non-porous surface. This allows it to be used with a pet food bowl 16 that most people already own. It also makes detachment of the pet food bowl 16 for cleaning quick and convenient. The insect deterrent cup 14 is slid coaxially onto a rod with male threads 20 at the back end of the suction cup 18. The rod with male threads is screwed into a pocket with female threads at the top end of the support shaft 22. The bottom end of the support shaft 22 has male threads and is screwed into a pocket with female threads at the top of the weighted base 24. Other types of bases, such as a tripod or a stake that is driven into the ground, could be used instead of the weighted base 24. Any crawling insects trying to reach the contents of the food bowl 16 would first have to crawl up the support shaft 22 and into the insect deterrent cup 14 before reaching the food. The layer of PetrolGel inside the insect deterrent cup 14 prevents insects from crawling across this area, without trapping them.

Figure 3:
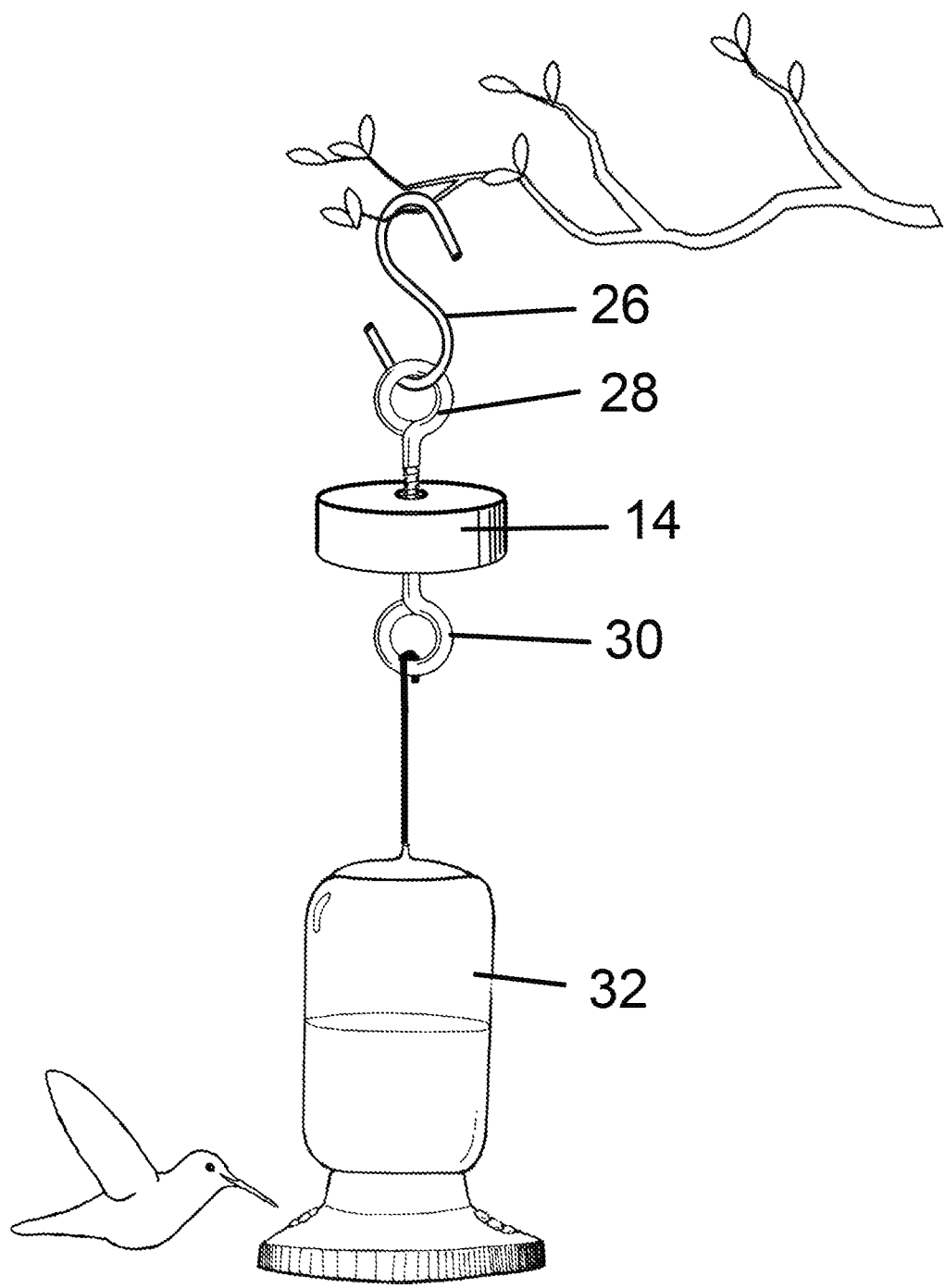
FIG. 3 is a perspective view of a hummingbird feeder suspended by a hanger with an insect deterrent cup constructed in accordance with one embodiment.

FIG. 3 is a perspective view of a hummingbird feeder 32 suspended by a hanger 26 with an insect deterrent cup 14, constructed in accordance with one embodiment. The hummingbird feeder 32 is hung from a lower eye 30. The end of the shaft of the lower eye 30 has a pocket with female threads. The insect deterrent cup 14 is slid coaxially onto the shaft of the lower eye 30. An upper eye 28 that has a shaft with male threads is screwed into the lower eye 30. The wire hanger 26 is used to hang the upper eye 28 from a tree branch or the eave of a building. Any crawling insects trying to reach the bird food would first have to crawl down the wire hanger 26, then down the upper eye 28, and then up inside the insect deterrent cup 14. The layer of PetrolGel inside the insect deterrent cup 14 prevents insects from crawling across this area, without trapping them.

Figure 4:
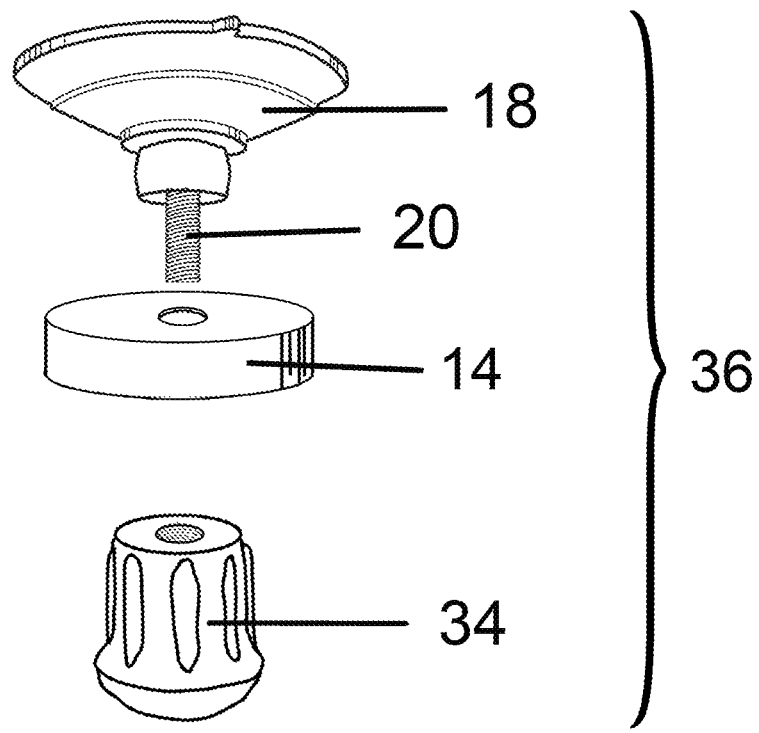
FIG. 4 is an exploded view of a support leg with an insect deterrent cup constructed in accordance with one embodiment. Three or more support legs can be attached under any freestanding object to keep it free from crawling insects.

FIG. 4 is an exploded view of a support leg 36 with an insect deterrent cup 14 that can be mounted under any object, constructed in accordance with one embodiment. The support leg 36 is attached under any flat surface using a suction cup 18, but other means of attachment could be used here, such as adhesive tape, glue, nuts and bolts, magnets, or Velcro®. The insect deterrent cup 14 is slid coaxially onto a rod with male threads 20 at the back end of the suction cup 18. The rod with male threads 20 is screwed into a pocket with female threads at the top of a rubber foot 34.

Figure 5:
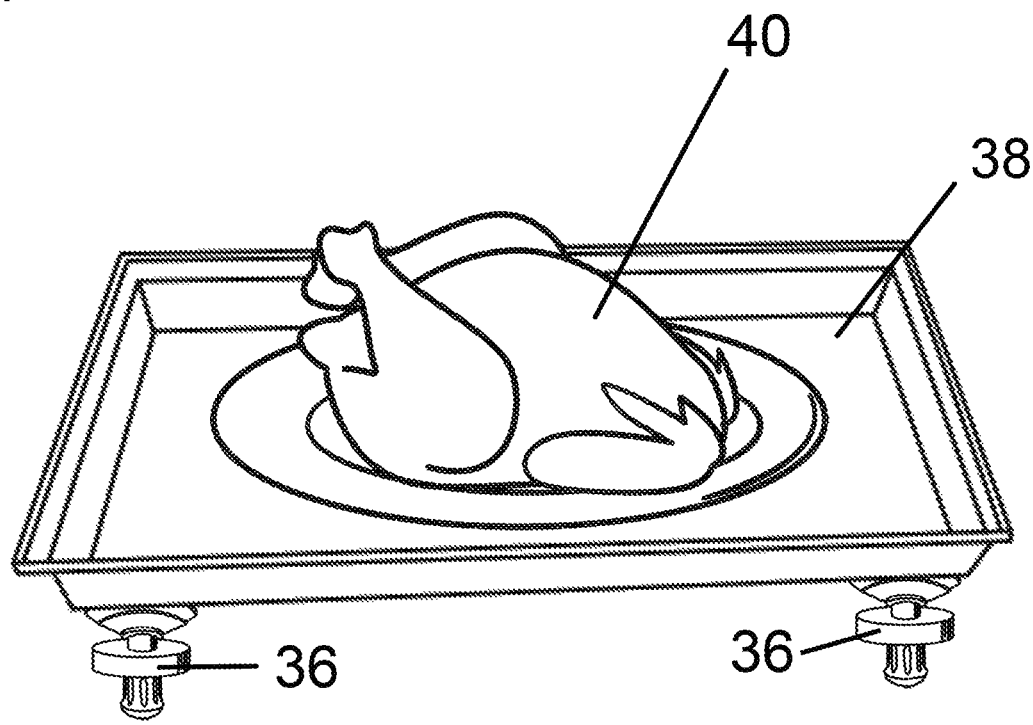
FIG. 5 is a perspective view of a tray supported by four support legs with insect deterrent cups, constructed in accordance with one embodiment.

FIG. 5 is a perspective view of a tray 38 supported by four support legs 36 with insect deterrent cups 14. In this embodiment, a roasted turkey 40 is shown as a non-limiting example, but any type of food or non-food item that a user wants to keep insects away from can be placed on the top side of the tray for protection. Any crawling insects trying to reach the roasted turkey 40 on top of the tray 38 would first have to crawl up one of the support legs 36 and into the insect deterrent cup 14. The layer of PetrolGel inside the insect deterrent cup 14 prevents insects from crawling across this area, without trapping them.

Operation

In operation, one coats a surface with a layer of high viscosity index petroleum based gel (HVIP-gel) to block the path of crawling insects to a site where food is located. One particular way to do this is to coat the inside surface of an inverted cup with a layer of HVIP-gel. This combination of inverted cup and HVIP-gel is referred to as an insect deterrent cup. The insect deterrent cup is then mounted between the insect's path and the food site. It could be mounted on a stand that supports a food bowl or on a line that suspends a hummingbird feeder. Multiple insect deterrent cups could be mounted to the bottom of a platter, table, or garbage can. All of these objects are used in a normal manner, and they remain protected from crawling insect infestations.

Advantages

There are several advantages of using PetrolGel:
Ants can't walk across it.
It is considered safe for incidental contact with food by the USDA.
It doesn't spill.
It doesn't melt in full sun in hot weather conditions.
It has a high viscosity index, so it remains effective as a barrier to crawling insects in cold and hot temperatures.
It is impervious to water, so it won't wash off in the rain.
It doesn't dry up.
It is odorless, tasteless, and colorless.

There are several advantages of applying the gel to the inside of an inverted cup:

The gel is protected from falling debris (such as pet food, pet hair, leaves, or rain).

The gel is protected from being bumped by your hands.

The gel is protected from being bumped by pets or wildlife.

A minimal amount of gel can be used.

The insect deterrent cup can be conveniently attached to a variety of locations where food is displayed, served, or stored.

Conclusions, Ramifications, and Scope

Our method of using a layer of HVIP-gel as a barrier to crawling insects is an effective, safe, convenient, and low-maintenance way to prevent ants and other crawling insects from infesting food, water, or garbage. In one embodiment (called an insect deterrent cup), a layer of PetrolGel is applied to the inside surface of an inverted (upside-down) cup and placed in any path an insect could take to reach the food. A number of advantages of this embodiment as well as other embodiments of our barrier to crawling insects can be realized:

(a) The insect deterrent substance is effective for many months in hot and cold temperature conditions without trapping insects or requiring re-application.

(b) There is no liquid to maintain or accidentally spill.

(c) The insect deterrent substance is non-toxic, safe for incidental contact with human food, odorless and tasteless, inexpensive, and easy for a layperson to apply.

(d) The insect deterrent substance is protected from being bumped by your hands (or your pets), and is protected from falling debris.

(e) The insect deterrent cup is easily attachable to a variety of locations, such as a pet food bowl, hummingbird feeder, kitchen tray, platter or trash can.

An insect deterrent cup is just one embodiment of our barrier to crawling insects. The insect deterrent cup does not have to be cylindrical in shape; for instance, it could be shaped like a disk, cone, or rectangular-shaped. In another embodiment, the underside of a supported object could be coated with a layer of HVIP-gel. In another embodiment, a vertical post (or wire) that supports (or suspends) an object could be coated with a layer of HVIP-gel. Electrical wires could be coated with a layer of HVIP-gel to prevent them from being traversed by ants or other crawling insects. The outer edges of an electrical outlet or light switch plate could be coated in a layer of HVIP-gel to prevent insects from using the outlet or plate as a point of entry into a house or business. Or a layer of HVIP-gel could be applied to a conical shaped piece of plastic that is wrapped around the trunk of a tree to prevent ants and other crawling insects from accessing the fruit, leaves, or sap of the tree. Thus the scope of the embodiments of our barrier to crawling insects should be determined by the claims, rather than the aforementioned examples.

What is claimed is:

1. A system for isolating an object from crawling insects, comprising:
   an object;
   at least three support legs;
   wherein each support leg comprises:
     a cup;
     a means for attaching said cup to the underside of said object so that said cup is in an inverted orientation;
     a rod protruding coaxially from the inside of said cup, said rod having a length greater than the height of said cup;
     a continuous layer of petroleum based gel on the inside surfaces of said cup;
     said petroleum based gel comprising 75-90% white mineral oil and 1-10% aluminum complex thickener;
   whereby crawling insects that travel up said rod will be unable to traverse said petroleum based gel and will be physically prevented from accessing said object.

2. The system of claim 1 wherein said means for attaching said cup to the underside of said object is adhesive tape.

3. The system of claim 1 wherein said object is a tray.

4. The system of claim 1 wherein said rod terminates in a rubber foot.

* * * * *